United States Patent [19]
Emmerich et al.

[11] Patent Number: 5,644,218
[45] Date of Patent: Jul. 1, 1997

[54] PROTECTION DEVICE FOR A SUPERCONDUCTING COIL OF A SUPERCONDUCTING VOLTAGE STABILIZER

[75] Inventors: Jeffery C. Emmerich; Eric L. Kostecki; Warren Buckles, all of Madison, Wis.

[73] Assignee: Superconductivity, Inc., Middleton, Wis.

[21] Appl. No.: 382,241

[22] Filed: Feb. 1, 1995

[51] Int. Cl.$^6$ .............................. H01F 36/00; H02H 9/00
[52] U.S. Cl. ............................................ 323/360; 361/19
[58] Field of Search ............................ 323/222, 223, 323/360; 361/19, 91, 141; 307/366

[56] References Cited

U.S. PATENT DOCUMENTS

| | | | |
|---|---|---|---|
| 4,393,429 | 7/1983 | Maki et al. | 361/19 |
| 4,467,384 | 8/1984 | Yuasa | 361/19 |
| 4,689,707 | 8/1987 | Schwall | 361/89 |
| 4,855,859 | 8/1989 | Tixador et al. | 361/19 |
| 4,930,034 | 5/1990 | Kusserow et al. | 361/19 |
| 4,956,740 | 9/1990 | Williams | 361/19 |
| 5,159,261 | 10/1992 | Kim et al. | 323/360 |
| 5,194,803 | 3/1993 | Visser et al. | 323/360 |
| 5,210,674 | 5/1993 | Yamaguchi et al. | 361/19 |
| 5,218,505 | 6/1993 | Kubo et al. | 361/19 |
| 5,278,380 | 1/1994 | Lowry | 219/635 |
| 5,303,111 | 4/1994 | Yamaguchi | 361/19 |
| 5,361,055 | 11/1994 | Peck | 335/216 |

*Primary Examiner*—Matthew V. Nguyen
*Attorney, Agent, or Firm*—McAndrews, Held & Malloy, Ltd.

[57] ABSTRACT

A superconducting voltage stabilizer is set forth which utilizes a superconducting coil for storing and releasing electrical energy. A first semiconductor switch is disposed to conduct current from the superconducting coil therethrough when the superconducting coil is to be charged or is to store energy and to inhibit current flow therethrough when the superconducting coil is to release energy. A crowbar circuit including a second semiconductor switch and a dump load are also employed. A third semiconductor switch is connected in parallel with the dump load and is disposed in series between the superconducting coil and the crowbar circuit. Quench detection and control circuits are employed for detecting a quench condition of the superconducting coil. In response to the occurrence of a quench condition, the quench detection and control circuits control the first and third semiconductor switches to go to an open condition, and the second semiconductor switch to go to a closed condition thereby to dissipate energy from the superconducting coil into the dump load. As a further enhancement to the reliability of the foregoing system, fail detection circuits are employed for detecting a fail condition of one or more of the first, second, or third semiconductor switches.

19 Claims, 6 Drawing Sheets

PROTECTION DEVICE FOR A SUPERCONDUCTING COIL OF A SUPERCONDUCTING VOLTAGE STABILIZER

TECHNICAL FIELD

The present invention relates to a protection device for a superconducting energy storage coil used in a voltage stabilizer system. More particularly, the present invention relates to a circuit arrangement for discharging the superconducting coil upon detection of a quench condition of the superconducting coil.

BACKGROUND

The quality of power delivered by utility systems determines how well electrical and electronic equipment operates. Any disturbances to the power system can severely affect the equipment's performance. Power disturbances typically result from lightning, utility switching and utility outages. Such disturbances can also be created by the users of power through the switching of loads, ground faults, or abnormally high demand from heavy normal equipment operation. In each of these situations, the depletion of power through the line is severe enough to affect the operation of electrical equipment being used by other utility customers. In one example, the fluctuating load of a large welder in a mill producing wire mesh can cause lights and television sets to flicker for approximately 500 residential customers who received their power from the same feeder line used to supply power to the mill. Proposed solutions in this case included powering the equipment by a diesel generator during evening hours or installing a special electric utility line connected directly to the mill at a substantial cost. A more desirable solution to the problem of voltage stabilization is set forth in U.S. Pat. No. 5,194,803, entitled "Superconductive Voltage Stabilizer" and issued on Oct. 9, 1990, to Visser et al. The energy storage system is illustrated here in FIG. 1.

Referring to FIG. 1, a superconductive voltage stabilizer is generally designated by the numeral 10. Superconductive voltage stabilizer 10 includes an AC/DC converter 20, a superconducting coil 30, a voltage regulator 40 and an energy storage cell 50.

The superconductive voltage stabilizer 10 has an AC/DC converter for converting alternating current to direct current. Three-phase alternating current provided by an AC supply line is connected to AC input 22 of AC/DC converter 20. AC/DC converter 20 has a first DC terminal 24 and a second DC terminal 26. Once the alternating current input has been converted to direct current, a direct current output is available between the first and second DC terminals.

The direct current is then directed to a superconducting energy storage coil 30, through its connection to one of the DC terminals, which is used to store the energy created by the direct current and developed by AC/DC converter 20. Energy storage coil 30 stores energy depending on the control of voltage regulator 40. In its most basic embodiment, voltage regulator 40 comprises a current switch controller 42 and a current switch 44, for example, a gate turn off thyristor (GTO). AC/DC converter 20 controls the amount of current flowing through superconductive coil 30. Initially, current switch controller 42 activates current switch 44 so that a current path is created. When current switch 44 is activated, direct current can flow from first DC terminal 24, through coil 30, through current switch 44 and back through second DC terminal 26.

Once a sufficient amount of energy is stored in coil 30 and energy is required by the energy storage cell, voltage regulator 40 halts the current path through current switch 44 thereby directing the current through energy storage cell 50. Storage cell 50 comprises, in its most basic form, an energy storage capacitor 52. Energy storage cell 50 is connected in parallel with a load through a first output line 60 and a second output line 62. The voltage regulator 40, through the use of current switch controller 42, deactivates current switch 44 so that a new current path is created. Direct current can then flow from the first DC terminal 24, through energy storage coil 30, through a first input line 64 of energy storage cell 50, through energy storage cell 50, out through a second input line 66 of energy storage cell 50 and back through second DC terminal 26. Thus, energy is stored in energy storage cell 50 until the voltage across the cell 50 reaches a predetermined level. Once that level has been achieved, voltage regulator 40 directs the direct current away from energy storage cell 50 and back through the voltage regulator 40.

When energy storage cell 50 is sufficiently charged, the supply of energy in energy storage cell 50 can be delivered to power a load through a first output line 60 and a second output line 62 of energy storage cell 50. Output lines 60 and 62 cooperate to provide an output current path to the load. As the load draws energy away from energy storage cell 50, the voltage across cell 50, measured between the first input line 64 and the second input line 66 begins to drop. Once the voltage across cell 52 drops to a set level, it is sensed by voltage regulator 40. At that time, current switch controller 42 deactivates current switch 44, so that energy stored in superconducting coil 30 is delivered to energy storage cell 50 and the load. The delivery of stored energy continues until the voltage across energy storage cell 50 reaches a predetermined maximum value. At that point, voltage regulator 40 senses cell 50 is fully charged, and through current switch controller 42, activates current switch 44 so that current flows once again through current switch 44.

Current switch 44 can comprise an insulated gate bipolar transistor (IGBT) having a collector lead 45, an emitter lead 46, and a gate lead 47. Collector lead 45 is coupled to first input line 66, and gate lead 47 is coupled to current switch controller 42, which controls the conduction of IGBT 44 through gate lead 47. Various other devices can be used in place of IGBT 44 and can include gate-turn-off thyristors and silicon controlled rectifiers.

Thus, energy storage cell 50 supplies energy to the load. As energy is drawn from cell 50 by the load, voltage regulator 40 senses the voltage across the cell 50, and controls the amount of energy released from coil 30 to cell 50. A portion of the direct current stored in coil 30 is thereby delivered to energy storage cell 50 in accordance with the energy requirements of the load.

In such a voltage stabilizer, there is a need to protect the coil in the event of a "quench" condition. A quench condition occurs when a portion of the superconducting coil 30 goes from a superconducting state to a resistive state. In such instance, the portion of the coil 30 that is in a resistive state may be unable to dissipate the power flowing therethrough thus resulting in damage to the coil. A scheme for protecting the coil is therefore necessary.

One such protection scheme is illustrated in FIG. 2. The protection scheme includes a mechanical dump contactor which is connected in parallel with a dump resistor. When the coil is in a storage or charging mode of operation, the GTO is triggered to a conducting state by the gate driver which, in turn, receives commands from the voltage regulator. The dump contactor is placed in a normally closed condition thereby providing a continuous current path through the GTO or IGBT current switch, dump contactor, and coil.

The voltage across the coil will increase in the event of a quench condition. The voltage across the coil may thus be used to detect a quench condition and to generate a signal indicative of the quench condition. This generated signal is applied, for example, to a programmable logic controller (PLC) or other logic circuitry to generate a signal which is used to cause the mechanical dump contactor to go to an open condition. In this open condition, the current that would typically flow through the dump contactor is instead directed through the dump resistor. The dump resistor thus dissipates the coil energy thereby preventing damage to the coil. Additionally, a coil heater may be activated to cause even heating of the coil to bring all portions of the coil to a resistive state. This provides further protection of the coil since the heat dissipation in the coil becomes less centralized.

Although the illustrated protection scheme may function adequately in many situations, a scheme which provides a faster response time, additional protection, and allows discharge at high voltage levels is desirable.

SUMMARY OF THE INVENTION

A superconducting voltage stabilizer is set forth which utilizes a superconducting coil for storing and releasing electrical energy. A first semiconductor switch is disposed to conduct current from the superconducting coil therethrough when the superconducting coil is to be charged or is to store energy and to inhibit current flow therethrough when the superconducting coil is to release energy. A crowbar circuit including a second semiconductor switch and a dump load are also employed. A third semiconductor switch is connected in parallel with the dump load and is disposed in series between the superconducting coil and the crowbar circuit. Quench detection and control circuits are employed for detecting a quench condition of the superconducting coil. In response to the occurrence of a quench condition, the quench detection and control circuits control the first and third semiconductor switches to go to an open condition, and the second semiconductor switch to go to a closed condition thereby to dissipate energy from the superconducting coil into the dump load.

As a further enhancement to the reliability of the foregoing system, fail detection circuits are employed for detecting a fail condition of one or more of the first, second, or third semiconductor switches. In one specific embodiment, the fail detection circuits include a first current sensor disposed to determine whether the second semiconductor is in an open or closed condition and a second current sensor disposed to determine whether the third semiconductor is in an open or closed condition. The quench detection and control circuits are responsive to signals from the first and second current sensors to turn on a coil heater either when the second semiconductor remains open or the third semiconductor remains closed after detection of the quench condition. As noted above, the heater causes the entire coil to go to a resistive state thus minimizing any potential damage from sustained localized energy dissipation that would otherwise occur.

With respect to a particular embodiment of the fail detection circuitry, the second current sensor is disposed in series with the dump load. The series connected second current sensor and dump load are connected in parallel with the third semiconductor switch. In this manner, the second current sensor may be used to detect a failure of the first semiconductor switch or the third semiconductor switch since a low current condition through the second current sensor is indicative of an improperly closed condition of either the first or third semiconductor switches during coil energy dumping.

In accordance with a still further embodiment of the protection scheme, the voltage stabilization system employs a mechanical dump switch disposed between the superconducting coil and the third semiconductor switch and a further dump load disposed in parallel with the mechanical dump switch. A mechanical dump switch control circuit is utilized for closing the mechanical dump switch during normal operation of the superconducting voltage stabilizer and for opening the mechanical dump switch in response to a quench condition thereby to discharge energy into the further dump load.

Other objects and advantages of the present invention will become apparent upon reference to the accompanying detailed description when taken in conjunction with the following drawings.

DETAILED DESCRIPTION OF THE PREFERRED EMBODIMENT

I. SYSTEM COMPONENTS AND TOPOLOGY

A. General System Topology

Figure 3:
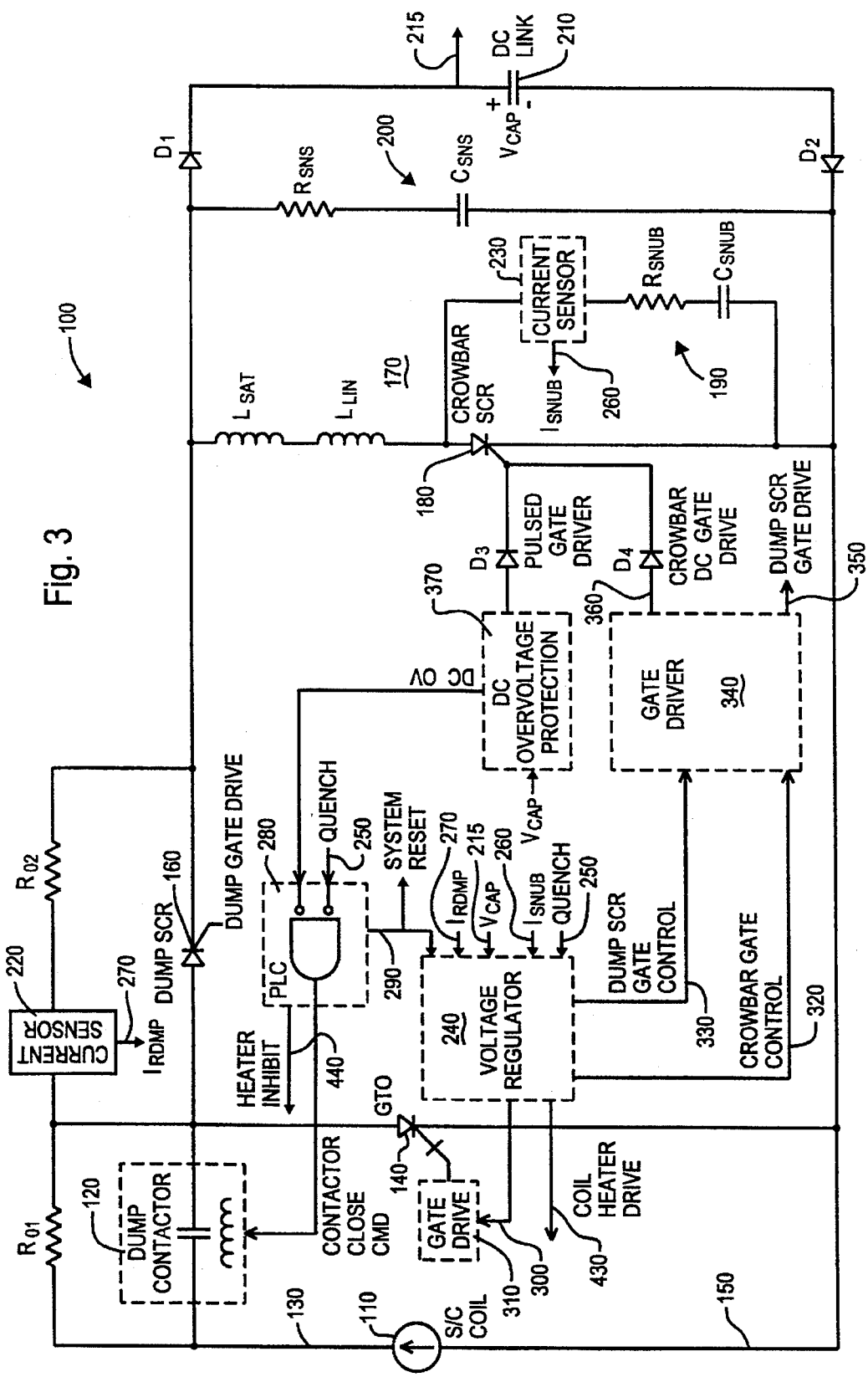
FIG. 3 is a schematic block diagram of a voltage stabilizer system employing one embodiment of an improved protection scheme for the protection of the superconducting coil.

A voltage stabilizer system having an improved protection scheme for protection of the superconducting coil is illustrated in FIG. 3. As illustrated, the system, shown generally at 100, includes a superconducting coil 110 (a.k.a. magnet) that stores energy from a power system in the manner described in connection with foregoing FIG. 1. One end of a mechanical dump contactor 120 is connected to end 130 of coil 110. The other end of the contactor 120 is connected to a gate turn on device (GTO) 140 which extends between the contactor 120 and the other end 150 of the superconducting coil 110. A dump load, illustrated here as a dump resistor $R_{D1}$, is disposed in parallel with the dump contactor 120.

A dump silicon controlled rectifier (SCR) 160 has its anode connected to the anode of the GTO 140 and the contactor 120. A further dump resistor $R_{D2}$ is disposed in a circuit branch that is parallel to the dump SCR 160.

The cathode of the dump SCR 160 is connected to a crowbar circuit, shown generally at 170 which extends to connect to end 150 of coil 110. The crowbar circuit 170 includes a series connected pair of inductors $L_{SAT}$ and $L_{LIN}$ which, in turn, are connected to the anode of a crowbar SCR 180 and a parallel connected snubber circuit 190 including resistor $R_{SNUB}$ and capacitor $C_{SNUB}$. A series connected RC circuit 200 is disposed between the cathode of dump SCR 160 and end 150 of coil 110. Current from the coil 110 is supplied through the dump SCR 160 and diodes $D_1$ and $D_2$ to a DC link capacitor 210 which functions as an energy storage cell in the manner described above. The voltage Vcap of the DC link capacitor 210 may be monitored at line 215.

Current sensors 220 and 230 are employed to monitor operation of the dump SCR 160 and the crowbar SCR 180, respectively. Current sensor 230 is disposed in series with the snubber circuit 190 that is disposed in a circuit branch that is parallel with the crowbar SCR 180. The operation of the crowbar SCR 180 during a quench condition of the coil 110 can thus be monitored at the appropriate times as will be described below. Similarly, current sensor 220 is disposed in series with dump load $R_{D2}$ in a circuit branch parallel with the dump SCR 160. Placement of the current sensor 220 in the illustrated manner allows a single current sensor to monitor proper operation of both the GTO 140 and dump SCR 160 during an energy dump from the coil 110 upon detection of a quench condition.

Logical control of the dump SCR 160, the GTO 140, and the crowbar SCR 180 is governed by voltage regulator 240 based on Vcap at lille 215, a quench signal (QUENCH) at one or more lines 250, the output of current sensor 230 ($I_{SNUB}$) at one or more lines 260, the output of current sensor 220 ($I_{RDMP}$) at one or more lines 270, and a reset signal from, for example, a programmable logic controller (PLC) 280 along one or more lines 290. A GTO GATE CONTROL signal is supplied from the voltage regulator 240 along one or more lines 300 to a gate drive circuit 310 which, in turn, provides the power circuits necessary to directly drive the gate of the GTO 140 in a known manner ill response to the received control GTO GATE CONTROL signal. Similarly, a DUMP SCR GATE CONTROL signal and CROWBAR GATE CONTROL signal are output oil lines 320 and 330, respectively, and are supplied to a further gate driver 340. Gate driver 340, provides the power circuits necessary to drive the gate terminal of the dump SCR 160 in a known manner via a DUMP SCR GATE DRIVE signal that is supplied along one or more lines 350 in response to the DUMP SCR GATE CONTROL signal from the voltage regulator 240. A CROWBAR DC GATE DRIVE signal is supplied from the gate driver 340 along line 360 through a diode $D_4$ to the gate of the crowbar SCR 180. The gate of the crowbar SCR 180 also receives a PULSED GATE DRIVE signal from a DC overvoltage protection circuit 370 through diode $D_3$, the operation of which will be discussed in detail below. Diodes $D_3$ and $D_4$ form a logical OR of the CROWBAR DC GATE DRIVE and PULSED GATE DRIVE signals.

B. Quench Detection and Heater System

Figure 4:
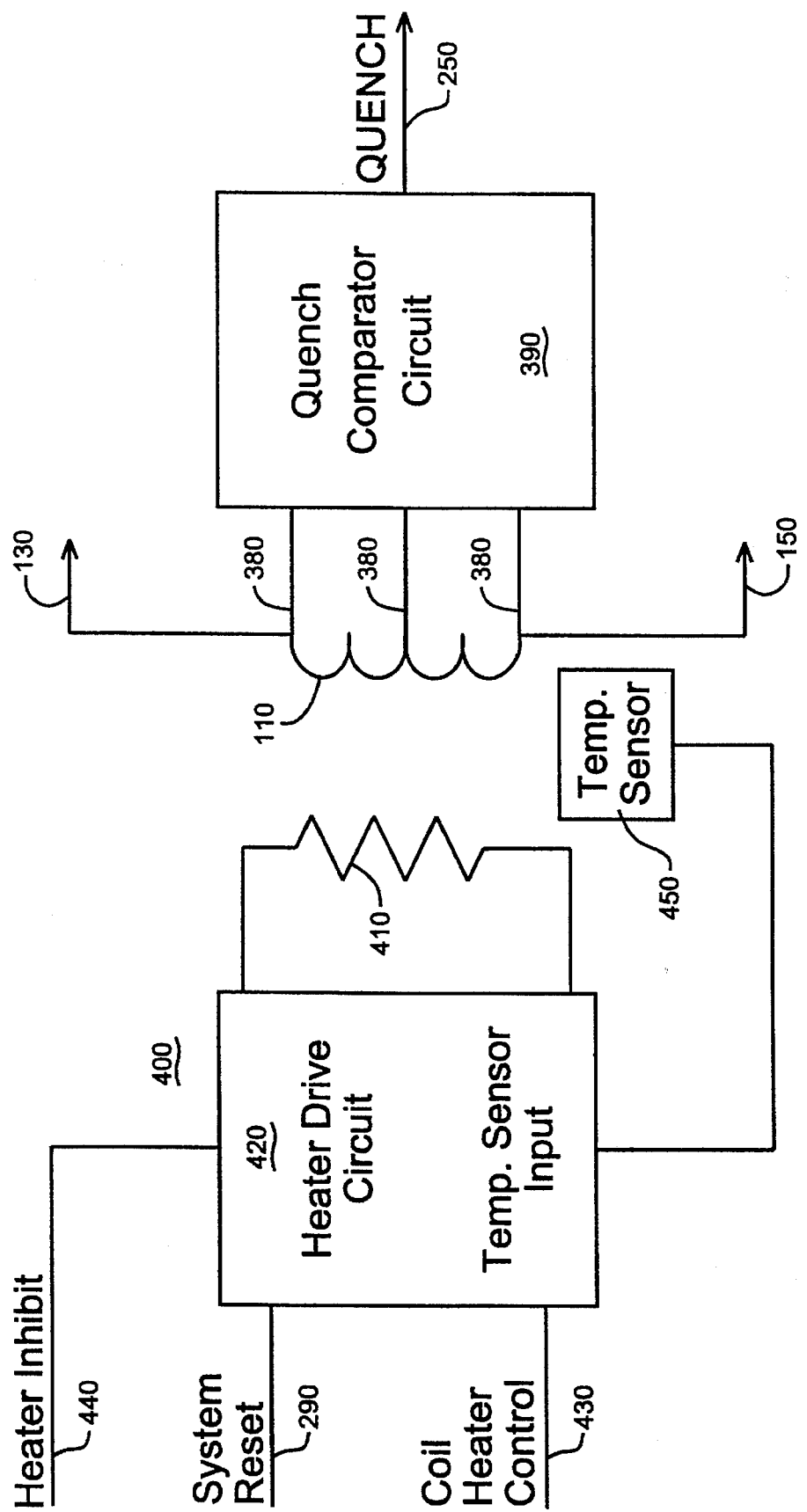
FIG. 4 is a schematic representation of one embodiment of a quench detection and heater system for use in the voltage stabilizer of FIG. 3.

FIG. 4 is a schematic representation of one embodiment of a quench detection and heater system for use in the system of FIG. 3. As illustrated, the superconducting coil 110 includes a plurality of leads 380 which are supplied to a quench comparator circuit 390. The quench comparator circuit 390 detects any increase in the voltage across one or more portions of the coil 110. Such increases are indicative of the occurrence of a quench condition of the coil 110 in which at least a portion of the coil 110 has gone from a superconducting state to a resistive state. A QUENCH signal is generated at output 250 indicative of a quench condition.

Also illustrated in FIG. 4 is a heater circuit, generally designated at 400. The heater circuit 400 includes a heater element 410 which is driven to heat the superconducting coil 110 by a heater drive circuit 420 in response to a COIL HEATER CONTROL signal received from the voltage regulator 240 along one or more lines 430. The PLC 280 supplies a SYSTEM RESET signal along line 290 and a HEATER INHIBIT signal along line 440. These signals from the PLC are used to inhibit firing of the heater element 410 notwithstanding a true condition of the COIL HEATER CONTROL SIGNAL. Operation of these signals will be described in further detail below.

Optionally, a temperature sensor 450 may be disposed to sense the temperature of the coil 110. The sensed temperature may be used by the heater drive circuit 420 to control the temperature of the coil 110 as it is heated to a fully quenched state.

C. Voltage Regulator

Figure 5:
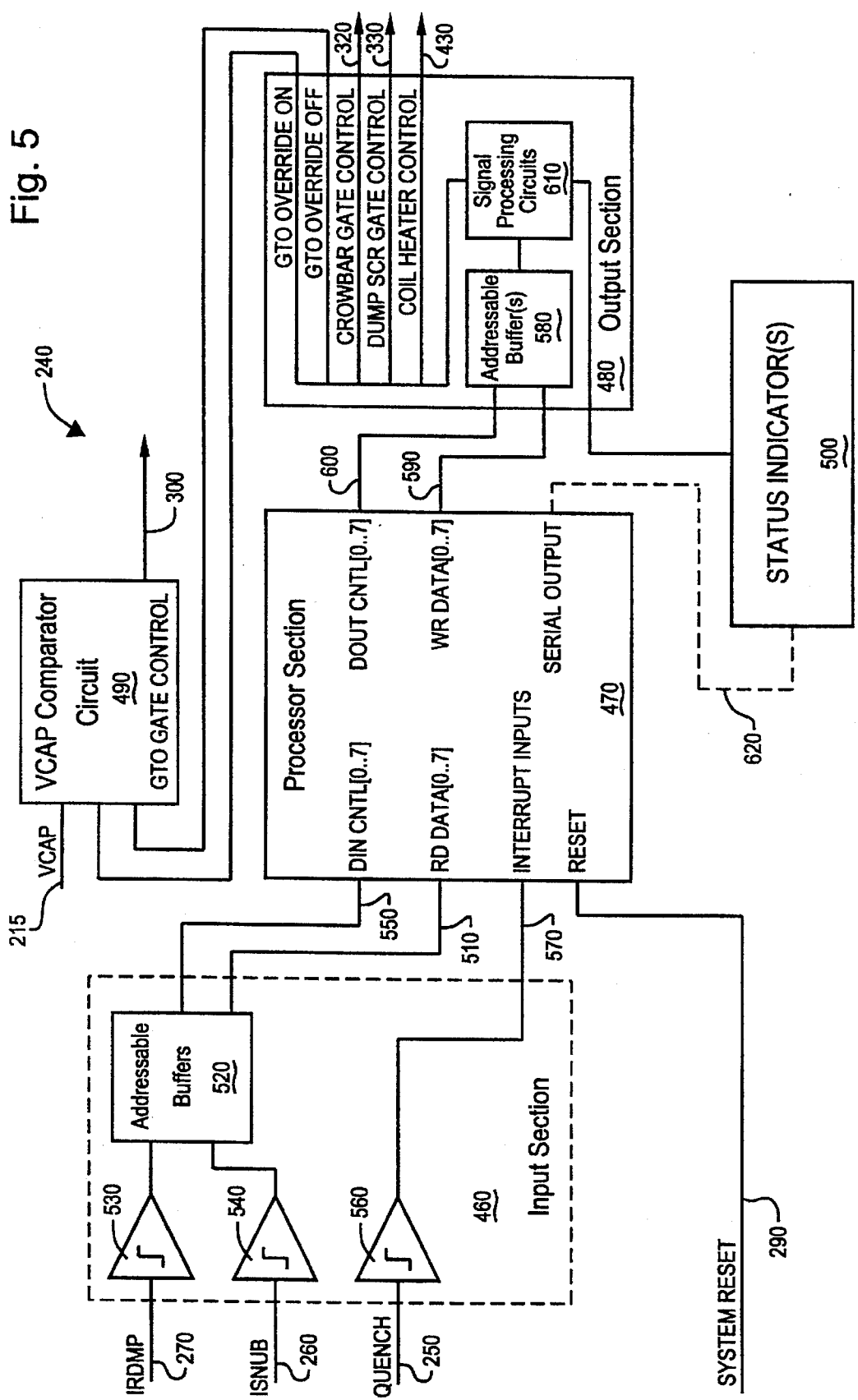
FIG. 5 is a schematic block diagram of one embodiment of a voltage regulator suitable for use in the voltage stabilizer of FIG. 3.

FIG. 5 is a block diagram of one embodiment of the voltage regulator 240. As illustrated, the voltage regulator 240 may be divided into an input section 460, a processor section 470, an output section 480, a Vcap comparator circuit 490, and a status indicator section 500. The processor section 470 may, for example, be constructed from an INTEL 87C51 microcontroller, or other suitable microcontroller, in a manner known to those of ordinary skill. The processor section 470 receives data from the input section 460 at the RD DATA inputs along lines 510. Such data includes the status of the $I_{RDMP}$ Mp and $I_{SNUB}$ currents detected by the current sensors 220 and 230. These signals, for example, are supplied to addressable buffers 520, through, for example, Schmitt trigger circuits 530 and 540. Control of access to the addressable buffers 520 is dependent on the DIN CNTL signals output from the processor section 470 along lines 550 in a known manner.

The QUENCH signal is supplied from the quench comparator circuit 390 (FIG. 4) to, for example, a Schmitt trigger circuit 560 at the input section 460. To provide prompt response to the detection of a quench condition, the output of the Schmitt trigger 560 is supplied to an interrupt input 570 of the microcontroller in the processor section 470.

The output section 480 may include one or more addressable output buffers 580 that receive output data WR DATA from the processor section 470 along lines 590. Selective access to the buffers 580 is controlled by the DOUT CNTL signals supplied along lines 600 from the processor section 470, the interconnection of the signals being implemented in a known manner. The outputs of the addressable buffers 580 may be, for example, supplied to further signal processing circuits 610 that, for example, convert the output signals to levels usable by the external components that the signals are to control. The ultimate output signals include the CROWBAR GATE CONTROL signal, the DUMP SCR GATE CONTROL signal, the COIL HEATER CONTROL signal, the GTO OVERRIDE ON and GTO OVERRIDE OFF signals.

Although the GTO GATE CONTROL signal may be provided by the microcontroller under software control of signals supplied through the output section 480 in the manner described with respect to other foregoing signals, the GTO GATE CONTROL signal of the illustrated embodiment is under control of Vcap comparator circuit 490. The Vcap comparator circuit 490 is responsive to the voltage Vcap across the DC link capacitor 210 to generate a GTO GATE CONTROL signal at line(s) 300. The GTO OVERRIDE ON and GTO OVERRIDE OFF signals are supplied to the Vcap comparator circuit 490 to cause the GTO GATE CONTROL signal to drive the GTO 140 to a steady on or off state irrespective of the voltage Vcap of the DC link capacitor 210.

The optional status indicator 500 is provided to indicate operational parameters, such as fail conditions, to a user. The status indicator 500 may include, for example, light emitting diodes that are controlled by the processor section 470 which generates signals that are supplied through the output section 480. Alternatively, or in addition, the status indicator 500 may include an alphanumeric display that is controlled by serial data that is transmitted from a serial data output of the processor section 470 along one or more lines 620. Other status indication schemes may also be utilized.

In accordance with one embodiment of the system 100, the gate driver 310 may be a GEC Plessey Model No. GDV90-20310, the GTO 140 may be GEC Plessey Model No. DG758BX45, the dump SCR 160 may be a GEC Plessey Model No. DCR14785Y, and the current sensors 220 and 230 may each be LEM Model No. LT200-S.

II. SYSTEM OPERATION

The foregoing described system topology and components provide a fast, solid state method of discharging the coil 110 when a quench is detected. This approach allows the discharge of the coil at voltages greater than those possible solely with the use of the mechanical contactor 120 and can commence the discharge over two orders of magnitude faster. The coil heater in the disclosed system need only provide a secondary mechanism for protecting the coil 110 and need only be fired in the event the other components of the system fail to discharge the coil. The mechanical contactor 120 and dump resistor $R_{D1}$ are maintained to discharge the coil 110 during DC link overvoltage conditions and system failures as discussed below. The bulk of the protection logic is embedded in the voltage regulator's microcontroller.

A. Normal Operation
Standby Mode

Figure 1:
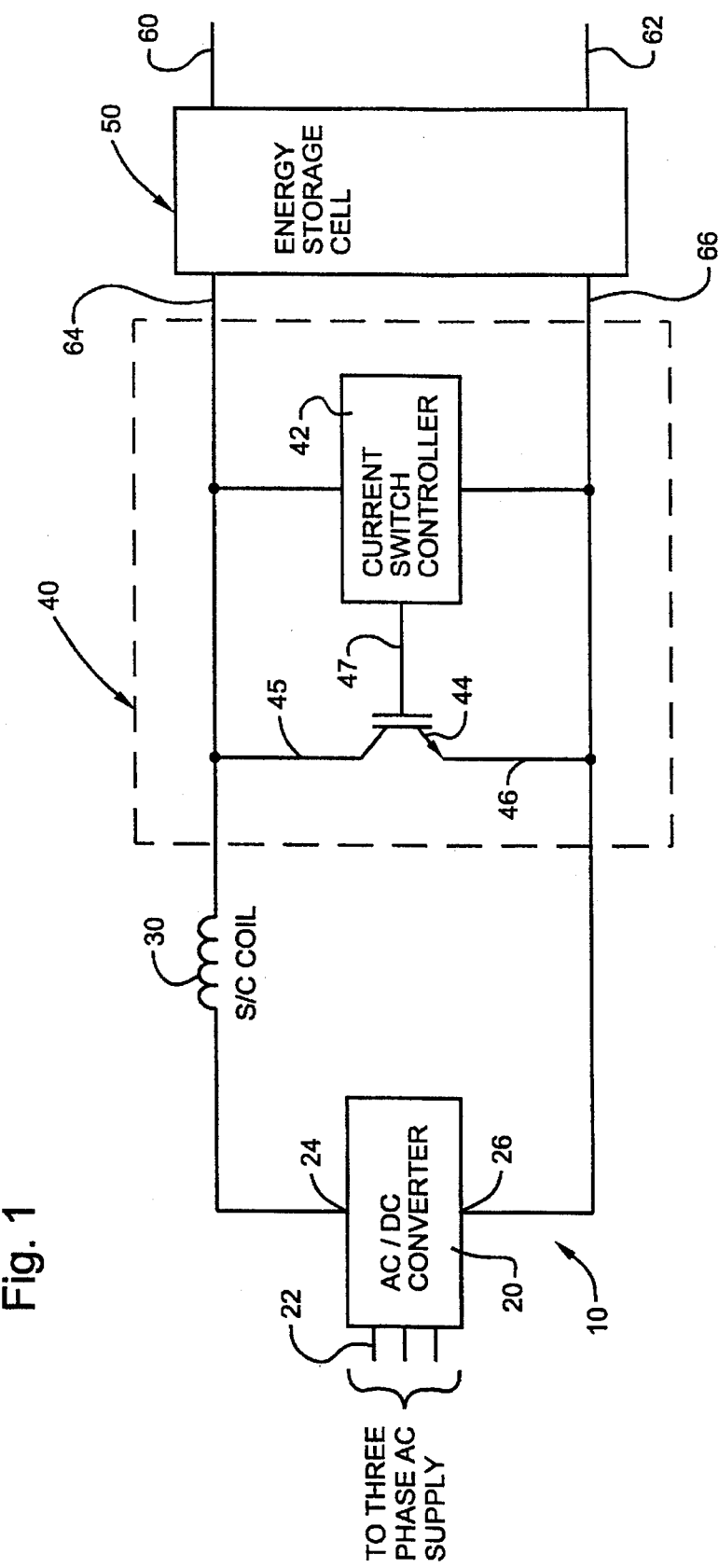
FIG. 1 is schematic block diagram of a known superconductive voltage stabilizer.
Figure 2:
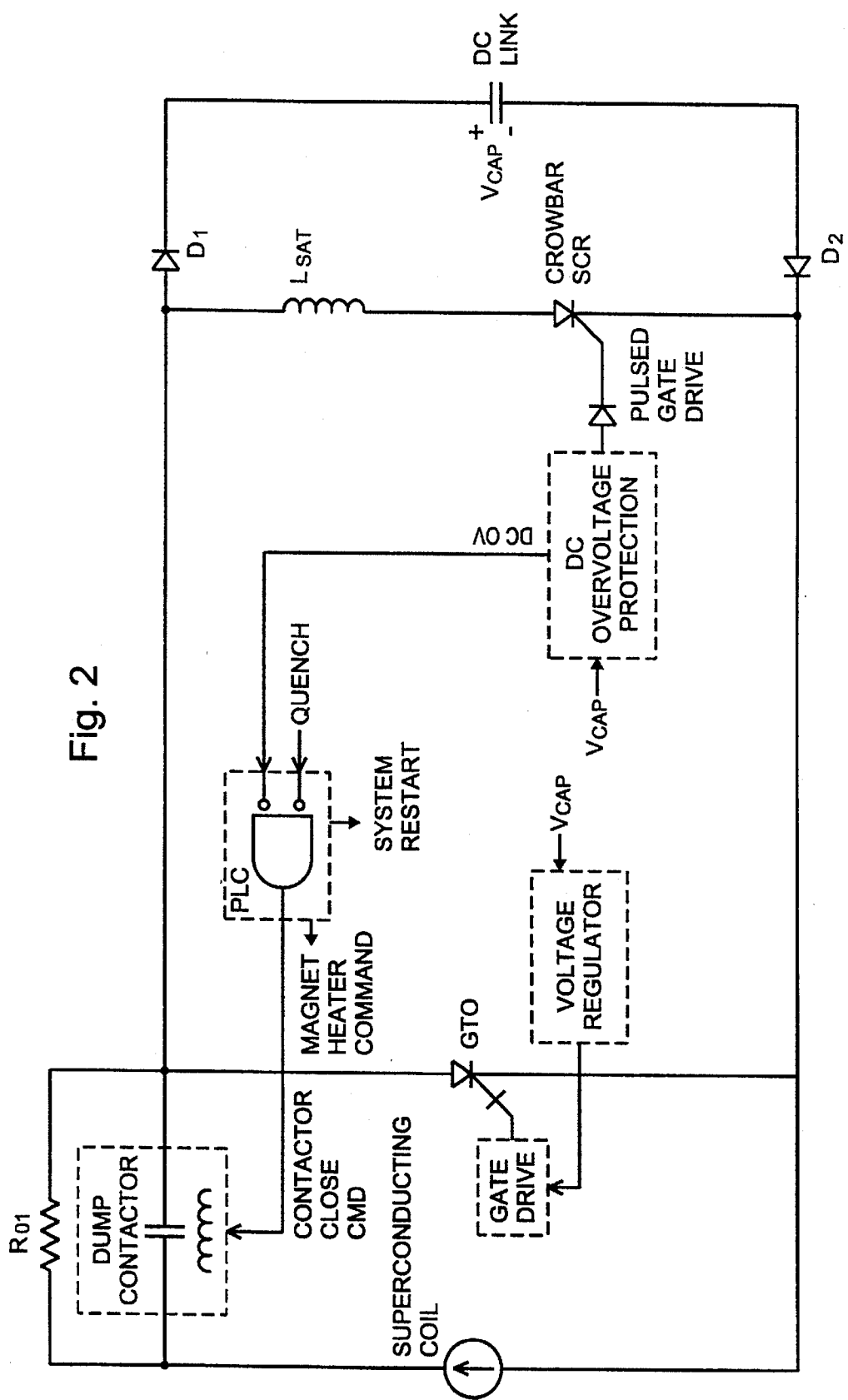
FIG. 2 is a schematic block diagram of a known superconductive voltage stabilizer that employs a scheme for protecting the superconducting coil in the event of a quench condition of the coil.

When waiting to carry the load, operation of the GTO 140 is the same as that described in connection with FIG. 1. The dump SCR 160 is continuously gated on in anticipation of a carryover. Diodes $D_1$ and $D_2$ prevent the flow of excess leakage current associated with continuously gated, reverse biased SCRs.

Carryover Operation

During a carryover when it is necessary to supply energy from the coil 110 to the DC link capacitor 210 (and therefrom to the load), current is diverted through the dump SCR 160 to replenish the DC link capacitor 210. The network consisting of $R_{sns}$ and $C_{sns}$ has a two-fold purpose. The first of these is to provide a gentle di/dt for the dump SCR 160 prior to diodes $D_1$ and $D_2$ going into conduction. This occurs during the interval immediately following turn off of the GTO 140. The network is also used in the detection of a failure of the dump SCR 160 which has failed open as described below.

System Reset/Power Up

When the system 100 is initially energized, the PLC 280 issues a reset pulse along line 290 to the voltage regulator 240 and other system control and protection circuitry. This reset causes the QUENCH signal output to go true. The logic executed by the processor section 470 checks the reset signal when the QUENCH signal input goes true. If a reset exists, the quench service routine is bypassed to avoid firing of the heater 400. The heater drive circuit 420 protects the coil 110 by ignoring the COIL HEATER CONTROL signal immediately after power up until a reset has been received. This allows time for the microcontroller in the processor section 470 to initialize the ports used to control the coil protection system.

B. Fault Operation
Quench Fault

When a quench condition of the coil 110 occurs, the QUENCH signal output from the quench comparator circuit 390 goes to a true condition and is ultimately provided to the interrupt input of the processor section 470 for interruption of the microcontroller. Detection of a quench fault causes the microcontroller to execute an interrupt service routine which attempts to dissipate the coil energy across dump load $Rt_{D2}$. Currents in the system are then monitored by the microcontroller to ensure the dump was successful. If the dump is not successful, the heater is fired.

Figure 6:
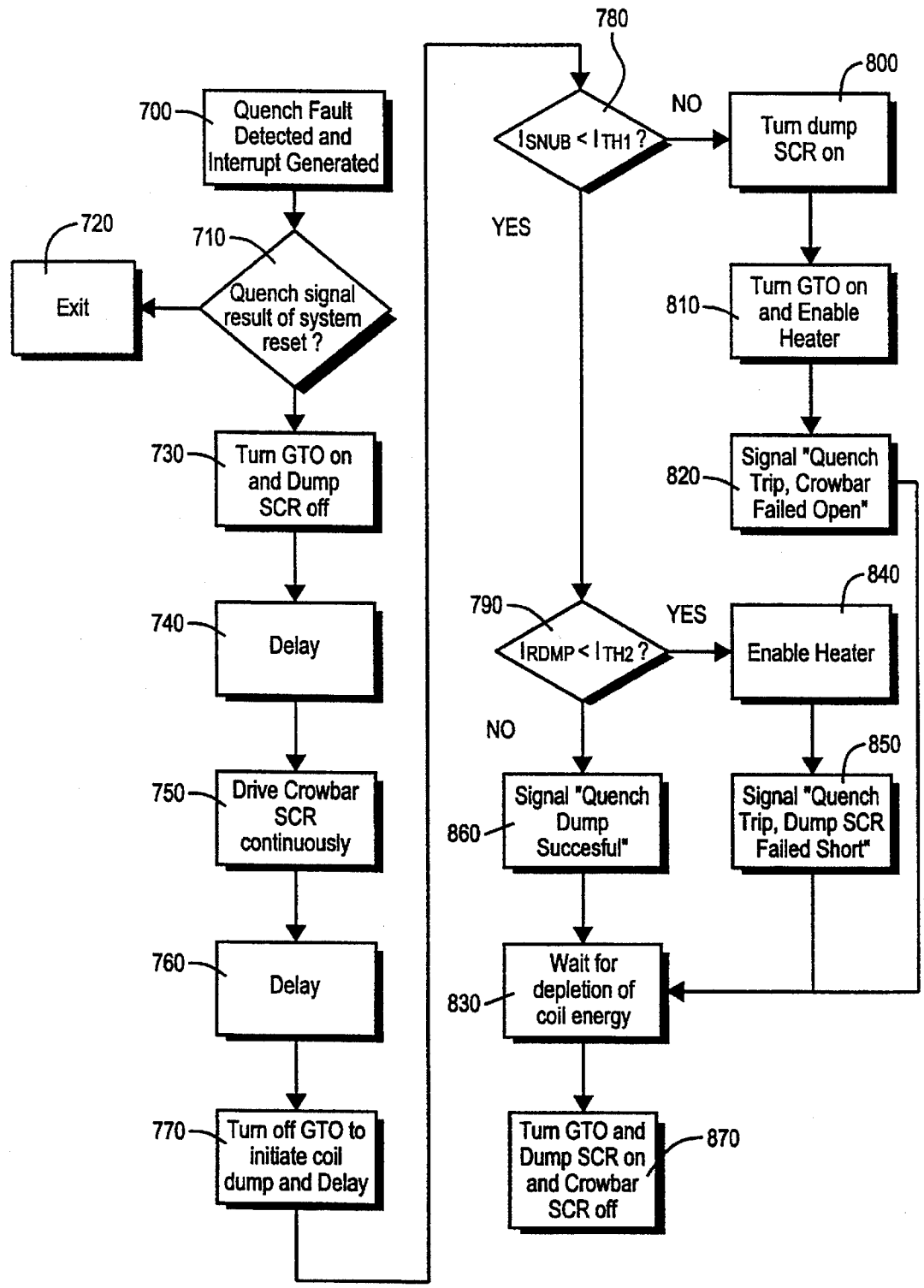
FIG. 6 is a flow chart illustrating one embodiment of system logic control operation in response to a quench condition of the superconducting coil of FIG. 3.

One manner of operating the foregoing system in response to a quench condition of the coil 110 is set forth in the flow diagram of FIG. 6. As illustrated, an interrupt is generated in response to the occurrence of a logic true of the QUENCH signal at step 700. The quench interrupt service routine will typically commence execution within a short time period, for example 8uS, of the QUENCH signal going true depending on, for example, the clock speed of the clock driving the microcontroller. It should be noted that other response times may occur dependent on system design.

The system then determines at step 710 whether the true QUENCH signal occurred as a result of a system reset and exits the interrupt routine at 720 if such is the case. In making this determination, the logic waits a time period before checking to see if the QUENCH signal is the result of a system reset. This allows for any propagation delay differences between the quench signal and reset signal generations. If the reset is not present, the quench dump sequence continues. If the reset is present, the dump sequence is terminated at 720, and the voltage regulator returns to normal operation. The quench interrupt may, for example, be edge triggered so that no further calls are made to the service routine while the PLC holds the system in reset.

Given that the QUENCH signal was not a result of system reset, the microcontroller takes command of the GTO and forces it to the on state at step 730 using, for example, the GTO OVERRIDE ON signal (FIG. 5). Gate drive to the dump SCR 160 is also removed at this time through control of the DUMP SCR GATE CONTROL signal. This ensures proper operation, even if the quench is detected during a carryover.

The logic then executes a delay at step 740 of, for example, approximately 700 uS, to ensure the dump SCR 160 is off. This also allows for the minimum GTO 140 on and off times as controlled by the GTO driver 310. After the delay, the crowbar SCR 180 is driven at step 750 to a continuously conducting on condition through use of the CROWBAR GATE CONTROL signal. The GTO 140 is still in a conducting state at this time as well.

At step 760, the logic waits a time period to ensure saturation of the gate of the crowbar SCR 180. After the delay, the GTO 140 is turned off at step 770 to a non-conductive state using the GTO OVERRIDE OFF signal (FIG. 5) to initiate dumping of energy from the coil 110 through the dump load $R_{D2}$. The dump contactor 120 may be driven by the PLC 280 to an open condition anytime after this point to facilitate further dumping of coil energy through dump resistor $R_{D1}$.

After the GTO 140 is turned off, the logic waits for a time period and checks for current through the SCR snubber circuit 190. If less than a predetermined amount of current $1_{TH1}$ (e.g., 50A) is detected at step 780 by the current sensor 230 as indicated by the $I_{SNUB}$ signal supplied to the voltage regulator 240, the crowbar SCR 180 is on in accordance with proper system operation and control passes to step 790. If the crowbar SCR 180 is off in accordance with a failed dump operation as determined by $I_{SNUB}$, the dump SCR 160 is driven to a conductive on condition at step 800 to protect the GTO 140 from destructive overvoltage. At step 810, the GTO 140 is commanded back on, and the heater 400 is enabled using, for example, the COIL HEATER CONTROL signal from the voltage regulator 240 of the illustrated embodiment to protect the coil from damage due to the quench. A "Quench trip, crowbar failed open" status signal is set at step 820 for indication to the user on the status indicator 500 and the logic control goes to step 830.

At step 790 the current flowing through $R_{D2}$ is checked. If less than a predetermined amount of current $1_{TH2}$ (e.g., 50A) is detected by the current sensor 220 as indicated by the $I_{RDMP}$ signal supplied to the voltage regulator 240, either the GTO 140 or the dump SCR 160 failed to turn off to a non-conducting state. The heater 400 is enabled at step 840 to protect the coil, and the status signal "Quench trip, dump SCR failed short" is provided to the user via the status indicator 500 at step 850. Logic control then passes to step 830.

If the current is above the threshold value $1_{TH2}$, a status signal indicating "Quench Dump Successful" is supplied to the user at step 860 via the status indicator 500.

At step 830 the logic waits between, for example, 10 and 11 seconds for complete depletion of the coil energy. After such depletion, the power semiconductors 140, 160, and 180 are returned to the standby state (i.e., GTO and dump SCR on, crowbar off). Control returns to the normal software loop, but the GTO 140 is permanently driven on by the microcontroller. GTO control is returned to the normal regulation logic following a system reset from the PLC.

In addition to the actions taken by the microcontroller, the PLC 280 will have tripped the mechanical dump contactor 120 in response to the QUENCH signal and enunciated the fault on, for example, a further status panel. The PLC 280 also monitors coil current and prevents the coil heater 400 from firing below a preset limit by control of the HEATER INHIBIT signal at line 440.

DC Link Overvoltage Fault

The system response to a DC link overvoltage occurs when the DC overvoltage protection circuit 370 senses a Vcap voltage in excess of a predetermined voltage threshold. In response to this condition, the overvoltage protection circuit 370 sends a pulsed gate signal to the crowbar SCR 180 to divert energy through inductors $L_{SAT}$ and $L_{LIN}$ as well as the crowbar SCR 180 itself. The overvoltage protection circuit 370 further notifies the PLC 280 of the overvoltage condition which, in turn, causes the PLC to trip the dump contactor 120 and enunciate the fault.

Dump SCR Failure

In the event that the dump SCR 160 fails to an open, non-conductive condition, the logic will trigger the crowbar PULSED GATE DRIVE signal any time more than a predetermined current value (e.g., 50A) is detected flowing through $R_{D2}$. Thus, if the dump SCR 160 were to fail open during a carryover, the crowbar SCR 180 would be fired. The network consisting of $R_{SNS}$ and $C_{SNS}$ provides an immediate current path upon GTO turn off before $D_1$ and $D_2$ go into conduction, allowing for earlier detection. Upon sensing the current, the voltage regulator places the GTO GATE CONTROL signal in a state which turns the GTO 140 to a conductive on condition and, further, sets the CROWBAR GATE CONTROL signal to a state which continuously drives the SCR crowbar 180 in a conductive on condition. Firing the SCR crowbar 180 causes the PLC 280 to open the dump contactor 120 and shut the system down. The microcontroller will hold the GTO 140 on until the PLC 280 issues a system reset.

System Power Supply Failure

If the power which is used to power the system control and protection circuitry fails, the GTO driver 310 turns the GTO 140 off, and the dump contactor 120 opens. It takes a period of time for the GTO off command to be issued, at which time a path for coil current must be provided until the coil can be safely discharged across $R_{D1}$. The overvoltage protection circuit 370 senses the loss of supply voltage and sends a pulsed trigger to the crowbar SCR 180, but the pulse will be terminated well before the GTO opens, and the current through $R_{D2}$ will be insufficient to ensure latching of the crowbar SCR 180. For this reason, the CROWBAR DC GATE DRIVE signal drive will also trigger upon loss of power but will have sufficient stored energy to maintain the gate signal for a period of time greater than the time it takes for the GTO off command thereby providing a continuous discharge path for the coil current.

Although the present invention has been described with reference to a specific embodiment, those of skill in the art will recognize that changes may be made thereto without departing from the scope and spirit of the invention as set forth in the appended claims.

We claim as our invention:

1. A superconducting voltage stabilizer comprising:

a superconducting coil for storing and releasing energy;

a first semiconductor switch disposed to conduct current from the superconducting coil therethrough to complete an energy storage loop when the superconducting coil is to store energy and to inhibit current flow therethrough to disrupt the current flow through the energy storage loop when the superconducting coil is to release energy;

a crowbar circuit including a second semiconductor switch;

a dump load disposed in a current path exterior to the energy storage loop;

a third semiconductor switch in parallel with the dump load and disposed in a current path exterior to the energy storage loop in series between the superconducting coil and the crowbar circuit;

quench detection and control means for detecting a quench condition of the superconducting coil and in response to the quench condition controlling the first and third semiconductor switches to go to an open condition, and the second semiconductor switch to go to a closed condition thereby to dissipate energy from the superconducting coil in the dump load.

2. A superconducting voltage stabilizer as claimed in claim 1 and further comprising fail detection means for detecting a fail condition of one or more of the first, second, or third semiconductor switches.

3. A superconducting voltage stabilizer as claimed in claim 2 and further comprising a heater disposed to heat the superconducting coil, the quench detection and control means being responsive to the fail detection means to turn the heater on upon failure of one or more of the first, second, or third semiconductor switches.

4. A superconducting voltage stabilizer as claimed in claim 3 wherein the fail detection means comprises:

a first current sensor disposed to determine whether the second semiconductor is in an open or closed condition;

a second current sensor disposed to determine whether the third semiconductor is in an open or closed condition;

the quench detection and control means being responsive to signals from the first and second current sensors to turn on the heater either when the second semiconductor sensor remains open or the third semiconductor sensor remains closed after detection of the quench condition.

5. A superconducting voltage stabilizer as claimed in claim 4 wherein the second current sensor is disposed in series with the dump load, the series connected second current sensor and dump load being connected in parallel with the third semiconductor switch.

6. A superconducting voltage stabilizer as claimed in claim 1 and further comprising:

a mechanical dump switch disposed between the superconducting coil and the third semiconductor switch; and a further dump load disposed in parallel with the mechanical dump switch; mechanical dump switch control means for closing the mechanical dump switch during normal operation of the superconducting voltage stabilizer and for opening the mechanical dump switch in response to a quench condition thereby to discharge energy into the further dump load.

7. A superconducting voltage stabilizer as claimed in claim 1 wherein the first semicondcutor switch is a GTO device.

8. A superconducting voltage stabilizer as claimed in claim 1 wherein the second semicondcutor switch is a SCR device.

9. A superconducting voltage stabilizer as claimed in claim 1 wherein the third semicondcutor switch is a SCR device.

10. A superconducting voltage stabilizer comprising:

an energy storage current loop comprising a superconducting coil for storing and releasing energy;

a current switch for disrupting current flow through the energy storage current loop thereby directing current flow from the energy storage current loop;

a quench switch circuit having an input connected to receive current from the energy storage current loop when the current switch disrupts the current flow through the energy storage current loop, the quench switch circuit comprising a dump load in a path parallel with a first semiconductor switch;

a crowbar circuit including a second semiconductor switch connected to receive current therethrough from the quench switch;

quench detection and control means for detecting a quench condition of the superconducting coil and in response to the quench condition controlling the current switch to disrupt current flow through the energy storage current loop and further controlling the first semiconductor switch to go to a non-conducting state and the second semiconductor switch to go to a conducting state thereby to dissipate energy from the superconducting coil in the dump load.

11. A superconducting voltage stabilizer as claimed in claim 10 and further comprising fail detection means for detecting a fail condition of one or more of the first and second semiconductor switches.

12. A superconducting voltage stabilizer as claimed in claim 11 and further comprising a heater disposed to heat the superconducting coil, the quench detection and control means being responsive to the fail detection means to turn the heater on upon failure of one or more of the first and second semiconductor switches.

13. A superconducting voltage stabilizer as claimed in claim 12 wherein the fail detection means comprises:

a first current sensor disposed to determine whether the first semiconductor switch is in an open or closed condition;

a second current sensor disposed to determine whether the second semiconductor switch is in an open or closed condition;

the quench detection and control means being responsive to signals from the first and second current sensors to turn on the heater either when the first semiconductor sensor remains open or the second semiconductor sensor remains open after detection of the quench condition.

14. A superconducting voltage stabilizer as claimed in claim 13 wherein the first current sensor is disposed in series with the dump load, the series connected second current sensor and dump load being connected in parallel with the first semiconductor switch.

15. A superconducting voltage stabilizer as claimed in claim 1 and further comprising:

a mechanical dump switch disposed in the energy storage current loop; and a further dump load disposed in parallel with the mechanical dump switch;

mechanical dump switch control means for closing the mechanical dump switch during normal operation of the superconducting voltage stabilizer and for opening the mechanical dump switch in response to a quench condition thereby to discharge energy into the further dump load.

16. A superconducting voltage stabilizer comprising:

an energy storage current loop comprising a superconducting coil for storing and releasing energy and a mechanical dump switch connected in series with the superconducting coil;

a first semiconductor switch disposed for disrupting current flow through the energy storage current loop thereby directing current flow from the energy storage current loop;

a first dump load connected in parallel with the mechanical dump switch a quench switch circuit having an input connected to receive current from the energy storage current loop when the first semiconductor switch disrupts the current flow through the energy storage current loop, the quench switch circuit comprising a dump load in parallel with a second semiconductor switch;

a crowbar circuit including a third semiconductor switch connected to receive current therethrough from the quench switch;

quench detection and control means for detecting a quench condition of the superconducting coil and in response to the quench condition controlling the first and third semiconductor switches to go to an open condition, and the second semiconductor switch to go to a closed condition thereby to dissipate energy from the superconducting coil in the dump load.

17. A superconducting voltage stabilizer as claimed in claim 16 wherein the quench detection and control means further controls the mechanical dump switch to go to an open condition during a quench condition.

18. A superconducting voltage stabilizer as claimed in claim 16 and further comprising fail detection means for detecting a fail condition of one or more of the first, second and third semiconductor switches.

19. A superconducting voltage stabilizer as claimed in claim 18 and further comprising a heater disposed to heat the superconducting coil, the quench detection and control means being responsive to the fail detection means to turn the heater on upon failure of one or more of the first, second, and third semiconductor switches.

* * * * *